June 3, 1969
JAMES E. WEBB
ADMINISTRATOR OF THE NATIONAL AERONAUTICS
AND SPACE ADMINISTRATION
HIGH PRESSURE AIR VALVE
3,447,774
Filed Dec. 27, 1966
Sheet 1 of 2
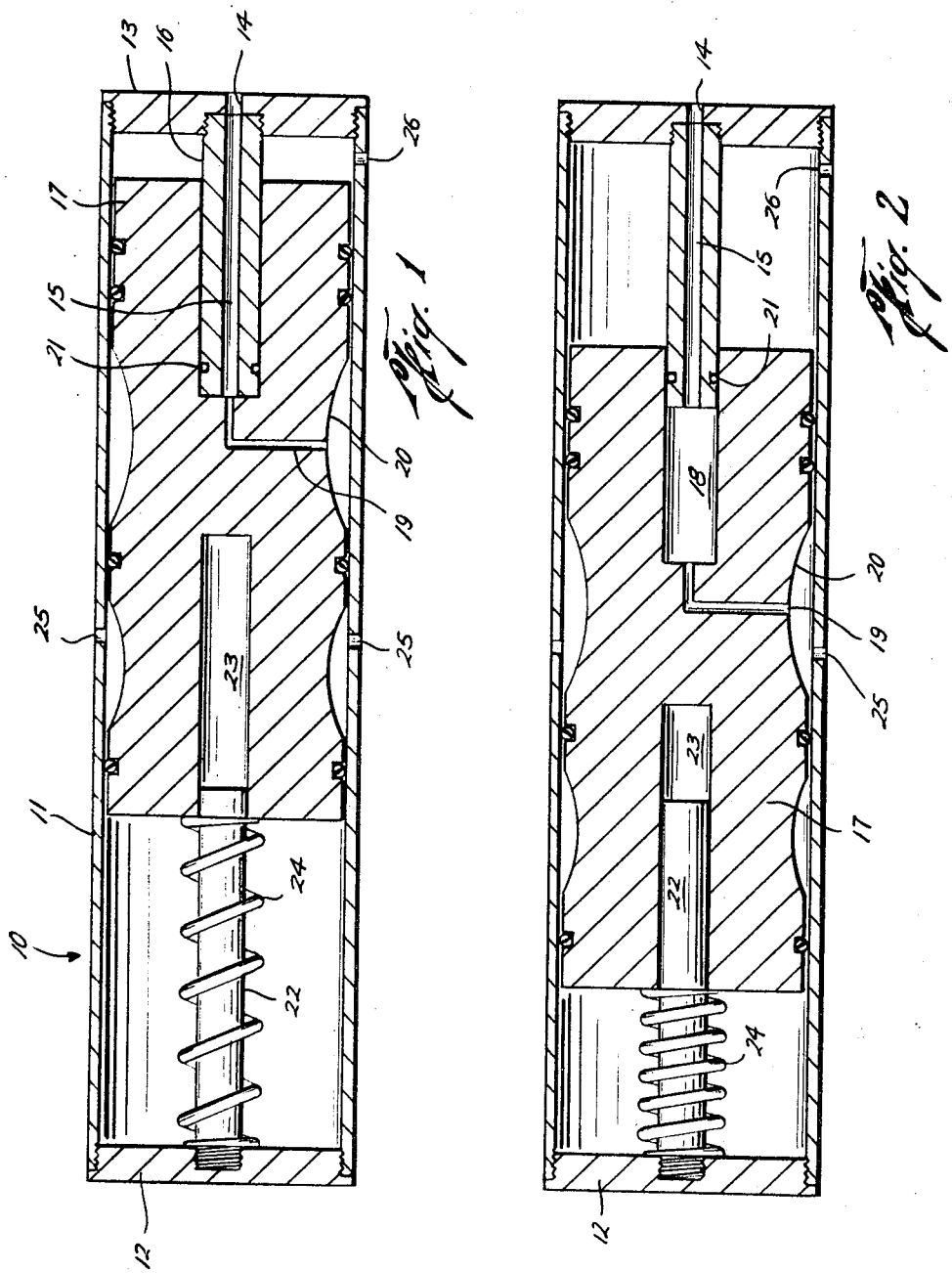
Benjamin T. Howland
INVENTOR.
BY
Drude Faulconer
ATTORNEY

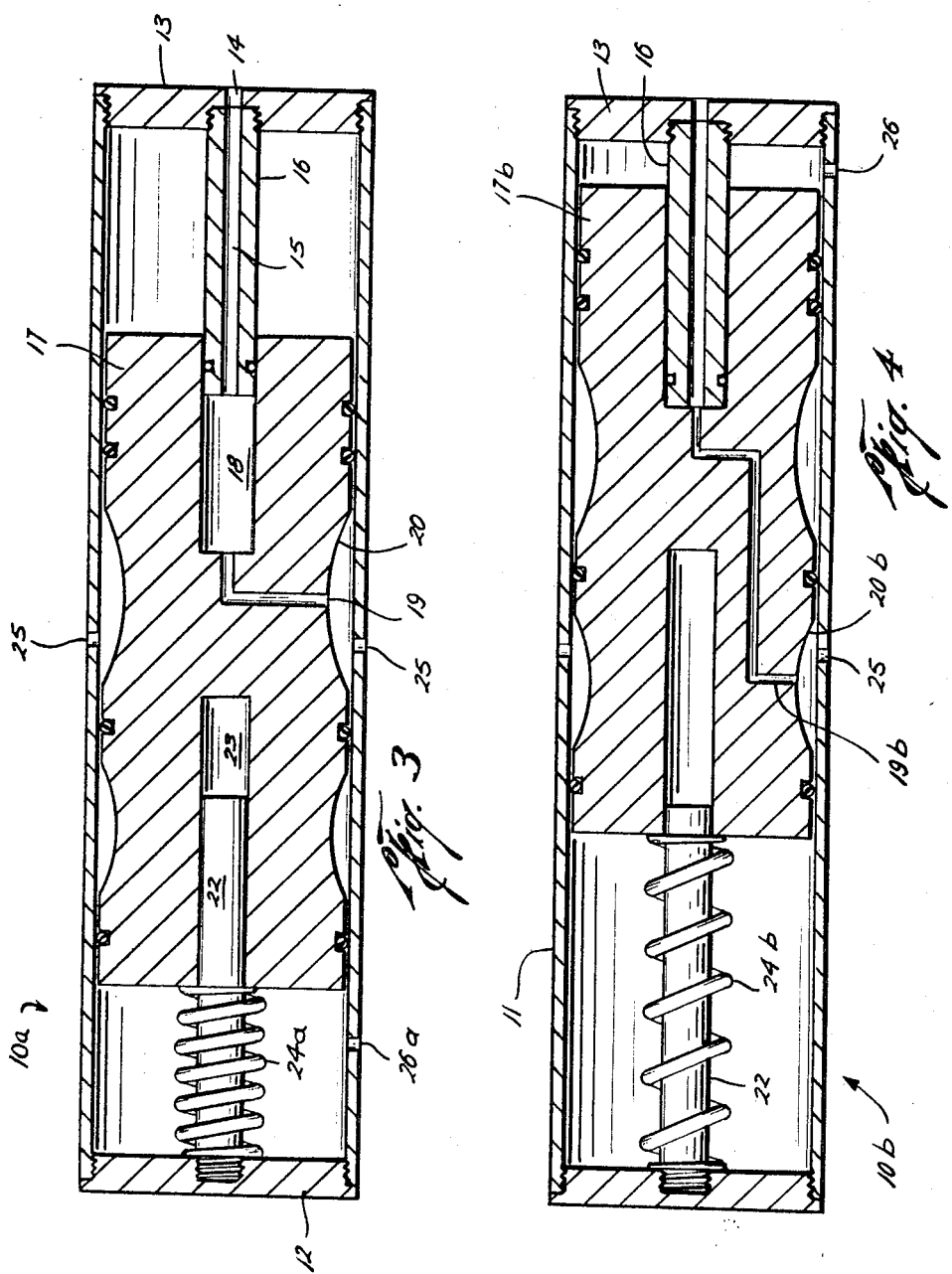

United States Patent Office 3,447,774
Patented June 3, 1969

3,447,774
HIGH PRESSURE AIR VALVE
James E. Webb, Administrator of the National Aeronautics and Space Administration, with respect to an invention of Benjamin T. Howland, Long Beach, Calif.
Filed Dec. 27, 1966, Ser. No. 605,090
Int. Cl. F16k 3/26, 17/04
U.S. Cl. 251—31                                         7 Claims

ABSTRACT OF THE DISCLOSURE

A high pressure control valve formed of an elongated hollow body having an inlet at one end and an outlet intermediate the two ends. A sliding valve having circumferentially extending, longitudinally spaced seal means is located in the body. A tubular member extending from the inlet port is telescopically and sealingly engaged with one end of the sliding valve. A passageway in the sliding valve extends from the tubular member to the circumferential wall and is either in or out of communication with the outlet port. A mandrel extends from the other end of the body and is telescopically engaged in the other end of the sliding valve. A spring extends between the end of the body and the valve to bias the sliding valve. An operating port extending into the body permits injection of fluid to move the valve from one position to another. The valve may be biased either open or closed.

---

The invention described herein was made in the performance of work under a NASA contract and is subject to the provision of section 305 of the National Aeronautics and Space Act of 1958, Public Law 85–568 (72 Stat. 435; USC 2457).

The invention relates to a valve, and more particularly relates to a valve for use in a high pressure system, said valve being operable from a remote position without exposing an operator to the source of high pressure.

In qualifying a spacecraft for manned flight, the craft and components thereof are subjected to a series of tests which simulate conditions which can be expected to be incurred during an actual flight. One such test involves subjecting certain spacecraft systems to extremely high pressure, e.g. 20,000 pounds per square inch. Where pressures of this magnitude are involved, there is always a possibility that some component in the high pressure system may rupture, thereby exposing anyone in the proximate area to possible severe injury. Therefore, it is desirable to isolate personnel who are conducting the tests from the high pressure system. In order to do so, it is necessary to operate the valves of the high pressure system from a remote station.

Previously, long metallic rods were used for adjusting and controlling high pressure valves of the type mentioned above. Using such methods has certain restrictions, i.e. the length of rods which can be conveniently handled is limited. Also, it is extremely difficult to manually close most valves where such high pressures are involved. Solenoid or motor operated valves are undesirable in several instances since the high pressure fluid used in certain tests is highly flammable, and there is an ever-present danger of sparks from electrically operated valves. Also, electrically operated valves are undesirable when the high pressure lines and associated valves are submerged under water.

The present invention provides a valve for use in high pressure systems which can easily be opened and closed by an operator stationed at a position remote from the high pressure system. This allows an operator to be isolated from the high pressure system, thereby insuring his safety even in the event that the valve or other component within the high pressure systems fails. Structurally, the valve of the present invention comprises a body having an inlet port adapted to be connected to the source of high pressure fluid which opens into said body. The inlet communicates with a mandrel which is attached to one end of the body. Slidably mounted on the mandrel is a spool valve which has a passage therein for allowing incoming fluid to pass through the spool valve. The spool valve is normally biased to a closed position by a compression spring which exerts a greater force on the valve than the force exerted by the incoming fluid. An operating port is provided in the body at the same end as the inlet, but is isolated therefrom by proper sealing means.

The operation of the valve is as follows. Fluid under high pressure is admitted to the valve through the inlet, but is blocked by the position of the spool valve which is biased to a closed position by the force of the spring. Since the force of the spring is greater than the incoming pressure, the spool valve will not move. To open the valve, a low pressure fluid is admitted through the operating port to act on the side of the spool valve opposite the side being acted upon by the spring. This low pressure supplements the force of the high pressure fluid to thereby develop a force greater than that of the spring. This causes the spool valve to move within the body to align the passageway within the valve with outlet ports in the body. When it is desired to close the valve, the low pressure is decreased in the body so that the pressure of the spring once again becomes greater than the incoming pressure, whereby the spool valve is moved back to its original position to close off the high pressure fluid. Thus the operator of the valve is exposed only to the source of the low pressure which constitutes no danger to his safety, and is never exposed to the high pressure system.

The valve can be modified wherein the operating port is located at the same end of the body as that at which the spring is located. The operation is slightly different in this modification in that the force of the spring is slightly less than the incoming pressure. Low pressure is admitted to the body to supplement the spring and to hold the spool valve in a closed position. When it is desired to open the valve, the low pressure in the body is decreased, whereby the incoming pressure exceeds the force of the spring, and the spool valve is moved to an open position. To close the valve, low pressure is again admitted to the body until the combined forces of the spring and the low pressure are greater than the incoming pressure.

Further, the valve of the present invention serves as a self-regulating valve in one aspect in that if the incoming pressure drops below a desired value the valve will automatically close, thereby warning an operator that the testing pressure has dropped to an undesired level. The actual construction, operation, and the apparent advantages of the invention will be better understood by referring to the drawings in which like numerals identify like parts in the different figures and in which:

FIG. 1 is a longitudinal, cross-sectional view of the invention with the spool valve in a closed position;

FIG. 2 is a longitudinal, cross-sectional view of the valve shown in FIG. 1 with the valve in an open position;

FIG. 3 is a longitudinal cross-sectional view of a modified form of the invention with the valve in a closed position; and FIG. 4 is a longitudinal cross-sectional view of a second modified form of the invention with the valve in an open position.

Referring more specifically to the drawings, the present valve 10 comprises a body 11 which is closed by caps 12 and 13, respectively. Cap 13 has an inlet 14 which communicates with bore 15 of mandrel 16 which in turn is threadably secured to cap 13 as clearly shown in the figures. Slidably mounted on mandrel 16 is a spool valve 17, said mandrel being telescopically received in chamber 18 of the spool valve. An L-shaped passage 19 fluidly communicates chamber 18 to annular recess portion 20 of spool valve 17. Any fluid that passes through bore 15 into chamber 18 and passage 19 cannot leak around mandrel 16 since O-ring seal 21 is provided on mandrel 16. Also, appropriate seals are provided on spool valve 17 to prevent leakage from recess portion 20.

Threadedly secured to cap 12 is a stabilizing rod 22 which cooperates with an elongated cavity 23 in spool valve 17 for the purpose of guiding and stabilizing said spool valve during relative movement between said spool valve and said body. Positioned on rod 22 between spool valve 17 and cap 12 is a compression spring 24, the purpose of which will be explained in detail below.

Body 11 has outlet ports 25 through which incoming fluid can leave the body 11, as will be explained below. Although two ports have been shown, it should be recognized that one or more outlets could be utilized without departing from the spirit of the invention.

An operating port 26 which is adapted to be connected to a source of low pressure (not shown) is provided in the body 11 for a purpose described below. Spring 24 is selected so that its bias force is slightly greater than the force of the high pressure fluid which is to be controlled by the valve. For example, if the pressure of the fluid is 20,000 p.s.i., then the spring would have a force equivalent to 20,050 p.s.i. It should be recognized that springs having different forces could be easily interchanged to allow the valve to control fluids at different pressures.

Operation of the valve is as follows. After the valve is assembled with spring 24 having the desired biasing force, the valve is positioned between the high pressure source (not yet actuated) and the rest of the system. The high pressure source is then actuated and fluid under high pressure is admitted to valve 10 through inlet 14. Since the pressure applied by this incoming fluid to the valve is less than the force of spring 24, spool valve 17 will remain in the position shown in FIG. 1 and the incoming fluid will be "dead-ended" in recess portion 20. When it is desired to open the valve, fluid under low pressure is admitted to the valve through operating port 26. This low pressure acting upon the spool valve 17 will supplement the high pressure acting upon the spool valve within chamber 18 and recess portion 20 so that the two pressures combined will exceed the force of spring 24. This allows spool valve 17 to move to the position shown in FIG. 2 wherein recess portion 20 is in communication with outlet ports 23. This allows the incoming fluid to pass through bore 15, passage 19, and out outlets 23. When it is desired to close the valve, the low pressure in body 11 is decreased until the force in spring 24 exceeds the forces tending to open the valve, whereupon the spring will move the valve back to the closed position shown in FIG. 1.

A modified form of the valve is shown in FIG. 3 and is identical to the basic construction of the valve shown in FIG. 1 with the exception of the location of the operating port and the force applied by the spring. In valve 10a the operating port 26a is located on the opposite side of the piston from that on which it is located in the valve of FIG. 1. Spring 24a is selected so that its biasing force is slightly less than the force exerted on the valve by the pressure of the fluid to be controlled. After the valve 10a is assembled into a high pressure system, fluid under low pressure is admitted to the valve through operating port 26a. This low pressure fluid will supplement the force of the spring 24a to hold the valve in a closed position as shown in FIG. 3. When it is desired to open the valve, the low pressure is reduced to a point where the force of the incoming fluid is greater than the force of the spring, whereby spool valve 17 is moved to an open position (not shown). When it is desired to close the valve, low pressure is again applied to operating port 26 to supplement the force of spring 24 which then moves spool valve 17 back to a closed position.

Each of the above disclosed modifications of the valve will function as a self-regulating valve in a restricted sense. That is, it can easily be seen that in each modification, if the pressure of the incoming fluid drops below its initial level, the closing force of the valve will be great enough to automatically close the valve. This will notify an operator that the high pressure source has dropped to an undesired level.

A second modification of the invention is shown in FIG. 4 and is identical to the structure of the valve of FIG. 1 except in valve 10b the passage 19b in spool valve 17b has been extended to the recessed portion 20b. By selecting spring 24b so that it has a biasing force greater than the force applied to spool valve 17b by the incoming fluid, the valve is normally biased to an open position. When it is desired to close the valve, low pressure fluid is admitted to body 11 through operating port 26. The combined forces of the incoming fluid and the low pressure fluid is sufficient to overcome the bias of spring 24b to close the valve. When the valve is to be reopened, the low pressure is decreased and spring 24b returns spool valve 17b to its normal position. Valve 10b is also a restricted self-regulating valve in that if the pressure of the incoming fluid increases above its initial value, spool valve 17b will automatically move to a closed position, thereby notifying the operator that the pressure is above the desired level.

As can easily be seen, a person operating the present invention is exposed only to the low pressure source necessary for opening and closing the high pressure valve, and is at no time exposed to the extreme high pressure being controlled by the valve. The invention provides a compact, highly efficient valve for a high pressure system which can be used in any environment where it is desirable to isolate personnel from a high pressure source and at the same time allow such personnel to remotely control the high pressure system. Although particularly embodiments of the subject invention have been illustrated and described, the disclosure is intended to cover all changes and modifications therein which do not constitute departure from the spirit and scope of the invention.

What is claimed and desired to be secured by Letters Patent is:

1. A valve capable of use in a high pressure system and one which can be controlled from a remote station comprising:
   an elongated, hollow body having an inlet at one end and an outlet intermediate the two ends, said inlet being adapted to be connected to a source of high pressure fluid;
   a valve means sealingly, slidably mounted in said body, said valve means having connection means at one end sealingly connecting the valve means with the inlet and having passage means communicating with the connection means allowing flow between said inlet and said outlet when in a first position and blocking flow between said inlet and said outlet when in a second position; and
   means in said body acting on said valve means for normally biasing said valve means to one of said positions when said high pressure fluid is being admitted through said inlet including;
   said body having an operating port therein which is isolated from both said inlet and said outlet, and which is adapted to be connected to a source of low pressure fluid whereby said low pressure fluid when admitted to said body through said operating port will act on said valve means to move said valve means to one of said positions.

2. A high pressure control valve which can be controlled from a remote station comprising:
   an elongated hollow, tubular body having an inlet at one end and an outlet intermediate the two ends;
   cylindrical valve means slidably mounted in said body;
   at least three, circumferentially extending, longitudinally spaced sealing members in said valve means forming seals between the valve means and the body;
   tubular means extending from the inlet sealingly engaged with one end of the valve means, a passageway in the valve means communicating with the tubular means and extending to the wall of the valve means intermediate two of the seal means thereby allowing flow between the inlet and the outlet when in a first position and blocking flow between the inlet and the outlet when in a second position;

means in the body opposite the inlet port acting on the valve means for normally biasing said valve means to one of the positions; and an operating port in the body which is isolated from both the inlet and the outlet, the operating port being adapted to be fluidly connected to a source of low pressure whereby low pressure fluid admitted to the body through the operating port will act on the valve means to move the valve means from one of its positions to the other of its positions.

3. The valve specified in claim 2 wherein the operating port is located adjacent the end of the body having the inlet.

4. The valve specified in claim 3 wherein the outlet is so positioned that the passageway in the valve means is positioned adjacent the outlet when there is no pressure in the operating port to overcome the biasing force.

5. The valve specified in claim 1 wherein the operating port is located at the end of body distant from the inlet.

6. The valve specified in any one of claims 3, 4 and 5 wherein the biasing means is formed of a spring extending from the end of the body distant from the inlet.

7. The valve specified in claim 6 wherein a mandrel extending from the end of the body distant from the inlet is telescopically engaged with the valve means and the spring extends about the mandrel.

References Cited

UNITED STATES PATENTS

| 785,646 | 3/1905 | Westbrook | 251—31 X |
| 1,516,011 | 11/1924 | Heath | 251—63 X |
| 2,509,880 | 5/1950 | Pelton | 251—63 X |
| 3,052,444 | 9/1962 | Kintner | 251—62 |
| 3,155,365 | 11/1964 | Hartung et al. | 251—31 X |

ARNOLD ROSENTHAL, *Primary Examiner.*

U.S. Cl. X.R.

251—63